United States Patent Office
3,594,390
Patented July 20, 1971

3,594,390
ISOTHIURONIUM SALTS
Helmut Timmler, Wuppertal-Vohwinkel, Ingeborg Hammann, Cologne, and Richard Wegler, Leverkusen, Germany, assignors to Farbenfabriken Bayer Aktiengesellschaft, Leverkusen, Germany
No Drawing. Filed Aug. 7, 1967, Ser. No. 658,631
Claims priority, application Germany, Aug. 30, 1966,
F 50,078
Int. Cl. C07f 9/16, 9/40
U.S. Cl. 260—308                 9 Claims

ABSTRACT OF THE DISCLOSURE (Alkyl, phenyl or O-alkyl)-(O-alkyl)-(O- or S-[4-unsubstituted or (amino, alkyl, phenyl or [halo, nitro, alkyl, alkoxy and/or alkylmercapto] substituted phenyl) substituted-5-unsubstituted or alkyl or phenyl substituted-1,2,4-triazoline-3- thione-2-yl-methyl]- -phosphoric, phosphonic, thiolphosphoric, thiolphosphonic, thionothiolphosphoric and thionothiolphosphonic acid esters which possess pesticidal, especially acaricidal and insecticidal, properties and which may be produced by reacting the corresponding phosphoric, phosphonic, thio or dithio -phosphoric or -phosphonic acid ester with the corresponding 2-(N-halomethyl)-1,2,4-triazoline-3-thione.

---

The present invention relates to and has for its objects the provision for particular new isotiuronium salts, i.e., phosphoric, phosphonic, and thio -phosphoric and -phosphonic acid esters of 1,2,4-triazoline-3-thione which possess pesticidal, especially insecticidal and acaricidal, properties, active compositions in the form of mixtures of such compounds with solid and liquid dispersible carrier vehicles, and methods for producing such compounds and for using such compounds in a new way especially for combatting pests, e.g., arthropods, with other and further objects becoming apparent from a study of the within specification and accompanying examples.

The reaction products of N-halomethylbenzazimides with dialkyl-thio- or -dithiophosphoric acids are described in German Pat. No. 927,270. According to the particulars given in such German patent, these thiophosphoric acid esters are distinguished by a good activity against sucking and eating insects, in particular against spider mites.

It has been found in accordance with the present invention that the particular new isothiuronium salts, i.e., phosphoric, phosphonic, thiol- and thionothiol- -phosphoric and -phosphonic acid esters of 1,2,4-triazoline-3-thione, of the formula

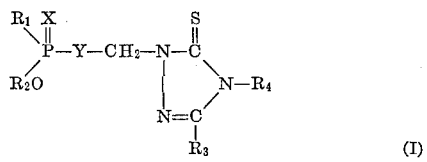

in which $R_1$ is selected from the group consisting of lower alkyl, lower alkoxy and phenyl, $R_2$ is lower alkyl, $R_3$ is selected from the group consisting of hydrogen, lower alkyl and phenyl, $R_4$ is selected from the group consisting of hydrogen, amino, lower alkyl, phenyl, and substituted phenyl which is substituted with at least one substituent selected from the group consisting of halo, nitro, lower alkyl, lower alkoxy, lower alkylmercapo, and mixtures of such substituents, and X and Y each respectively is selected from the group consisting of oxygen and sulfur, exhibit strong pesticidal, especially insecticidal and acaricidal, properties.

It has been furthermore found in accordance with the present invention that a versatile process for the production of the particular new isothiuronium salts of Formula I above in favorable yields may be provided, which comprises reacting the corresponding phosphoric, phosphonic, thiol- or thionothiol- -phosphoric or -phopsphonic acid ester of the formula

in which $R_1$, $R_2$, X and Y are the same as defined above, in the form of the corresponding alkali metal (e.g., sodium, potassium, etc.) or ammonium salt or in the presence of an acid binding agent, with a 2-(N-halomethyl)-1,2,4-triazoline-3-thione of the formula

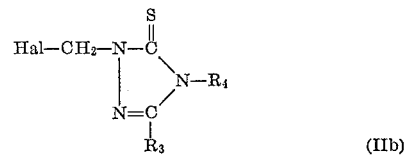

in which $R_3$ and $R_4$ are the same as defined above, and Hal is a halogen atom such as chloro, bromo, iodo and fluoro, especially chloro.

Advantageously, the particular new phosphorus-containing 1,2,4-triazoline-3-thione derivatives of the present invention are distinguished by outstanding insecticidal and acaricidal properties. Surprisingly, the instant active compounds have a much better arthropodicidal activity than the most nearly comparable known substances of analogous constitution and of the same type of activity. The instant active compounds therefore represent a substantial enrichment of the art.

The course of the process for producing the particular new compounds of the present invention is illustrated by the following reaction equation:

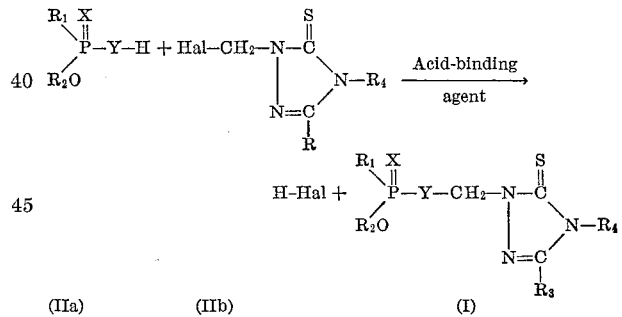

In the above equation, the symbols $R_1$, $R_2$, $R_3$, $R_4$, X, Y and Hal are the same as defined above.

The corresponding phosphoric, phosphonic, and thio- or dithio-phosphoric (-phosphonic) acid esters of general Formula IIa which may be used in the instant production process as starting materials are known from the literature and may readily be obtained, even on an industrial scale. In the present process they are preferably used in the form of their potassium, sodium or ammonium salts. As already mentioned above, however, it is also possible to use, instead of the aforesaid salts, the corresponding free acids in the presence of the usual acid-binding agents. Particularly suitable acid-binding agents include alkali metal hydroxides, carbonates and alcoholates, for example potassium- and sodium- hydroxide, carbonate, methylate and ethylate, and also tertiary organic bases, such as triethylamine, dimethylaniline and pyridine.

The corresponding 2-(N-halomethyl)-1,2,4-triazoline-3-thione derivatives of Formula IIb which may be used as second reactant in the instant production process are also, in part, described in the literature (cf. Chim. geterocikl. Soed. 1965, No. 1, page 138). Those which are not known can be prepared in customary manner, starting from the corresponding 1,2,4-triazolinethiones by reaction with formaldehyde and subsequent halogenation of the N-hydroxymethyl derivatives obtained as intermediate products by means of the usual halogenation agents, for example elementary chlorine or acid halides of phosphorus or sulfur, preferably with the aid of phosphorus pentachloride or thionyl chloride.

The production process reaction of the present invention is preferably carried out in the presence of an inert solvent (this term includes a diluent). As such, practically all the usual solvents are suitable including, for example, hydrocarbons (for instance benzine, benzene, toluene, xylene), chlorobenzenes and ethers (for instance diethyl and dibutyl ether and also dioxan and tetrahydrofuran), and the like. Particularly good results have been obtained with low-boiling aliphatic alcohols, nitriles and ketones, for example methanol, ethanol, n- and iso-propanol, acetone, methylethyl, methylisopropyl and methylisobutyl ketone, and aceto- and propio-nitrile.

The production process reaction can be carried out within a fairly wide temperature range. The reaction may take place with sufficient speed even at room temperature, but can also be taken to completion at elevated temperature. In general, the reaction is carried out at substantially between about 20 to 80° C., preferably at between about 40 to 50° C.

As can be seen from the above reaction equation, equimolar amounts of the starting materials and of the acid-binding agent are required for the reaction. In most cases, however, the ester of Formula IIa is used in about 10% excess. Moreover, it has proved expedient to continue stirring of the reaction mixture (after mixing the reactants) for a longer period (optionally with heating to the above-mentioned temperatures) in order to complete the reaction. In this case the products of the process are obtained in particularly good yields and with outstanding purity.

Advantageously the active compounds in accordance with the present invention have been found to possess an outstanding, rapidly-commencing and long-lasting insecticidal and acaricidal effectiveness, with negligible toxicity to warm-blooded animals as well as concomitantly negligible phytotoxicity. Such compounds are therefore usable with outstanding success in plant protection endeavors for the control of noxious sucking and biting insects, Diptera and mites Acari.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), further the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina) for example the oleander scale (*Aspidiotus hederae*) and the soft scale (*Lecanium hesperidum*) as well as the grape mealybug (*Pseudococcus maritimum*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein above all there should be mentioned butterfly caterpillars (Lepidopeter) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), further the ermine moth (*Hyponomeuta padella*), the Mediterranean flour moth (*Ephestia Kuhniella*) and greater wax moth (*Galleria mellonella*); and the like. Also to be classed with the biting insects contemplated herein are bettles (Coleoptera), for example the granary weevil (*Sitophilus granarius-Calandra granaria*), the Colorado beetle (*Lepinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm, (*Tenebrio molitor*) and the saw-toothed grain beetle (*Oxyzaephilus surinamensis*), but also species living in the soil, for example wireworms (Agriotes spec.) and larvae of the cockchafer (*Melolontha melolontha*); cockroaches, such as the German cockroach (*Blatella germanica*), American cockroach (*Periplaneta americana*), Maderia cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivita*; further, Orthoptera, for example the house cricket (*Gryllus domesticus*); termites such as the eastern subteranean termite (*Reticulitermes flavipes*) and Hymenoptera such as ants, for example the garden ant (*Lasius niger*); and the like.

The Diptera contemplated herein comprise essentially the files, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetranydus urticae*) and the European red mite (*Paratetranychus pilosus-Panonychus ulmi*), blister mites, for example the currant blister mite (*Eriophyes ribis*) and tarsonemids, for example the board mite (*Hemitarsonemus latus*) and the cyclamen mite (*Tarsonemus pallidus*); finally, ticks, such as the relapsing fever tick (*Ornithodorus moubata*); and the like.

The particular active compounds to be used according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1969, pages 35–38). The following may be chiefly considered for use as carrier vehicles for this purpose: disperisble liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistantes, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as ligin, sulfite waste liquors, methyl cellulose, etc.

As will be appreciated by the artisan, the active compounds according to the instant invention may be employed alone or in the form of mixtures with one another and/or with such solid or liquid dispersible carrier vehicles and/or with other known compatible active agents, especially plant protection agents, such as other insecticides, fungicides, herbicides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., surface-active agent, such as emulsifying agent and/or a dispersing agent, and an amount of the active compound which is effective for the purpose in question, and which is generally about 0.00001–95%, and preferably 0.01–95%, by weight of the mixture.

Furthermore, the present invention contemplates methods of selectively controlling or combatting pests, e.g., arthropods, i.e., insects and acarids, and more particularly, methods of combatting at least one of insects and acarids which comprises applying to at least one of (a) such insects, (b) such acarids, and (c) the corresponding habitat, a correspondingly combative amount, i.e., an arthropodicidally, especially insecticidally or acaricidally, effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like, whereby to apply the active compounds either to the plant parts themselves or to the vicinal soil itself, or both.

It will be realized, of course, that the concentration of the particular active compound utilized in admixture with the carrier vehicle will depend upon the intended application. Therefore, in special cases, it is possible to go above or below the aforementioned concentration ranges.

The use of the instant active compounds in the veterinary field is especially contemplated and this may take place in known manner, for example by oral application in the form of tablets, capsules, draughts, granulates, and by dermal application, for example by dipping, spraying, pouring on or dusting over, as well as by parenteral administration, for example by injection.

The outstanding insecticidal and acaricidal activity of the instant active compounds when used against a multiplicity of pests, as well as their superiority when compared with analogously structured known compounds, is illustrated without limitation by the following examples.

EXAMPLE 1

Drosophila test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

1 cc. of the preparation of the given active compound is applied with a pipette to a filter paper disc of 7 cm. diameter. The wet disc is placed in a glass vessel containing 50 vinegar flies (*Drosophila melanogaster*) and covered with a glass plate.

After the specified period of time, the destruction is determined as a percentage: 100% means that all the flies are killed; 0% means that none of the flies are killed.

The particular active compounds, their concentrations, the evaluation time and the degree of destruction can be seen from the following Table 1:

TABLE 1

| Active compound (constitution) | Concentration of active compound, percent | Degree of destruction, percent after 24 hrs. |
|---|---|---|
| (A) 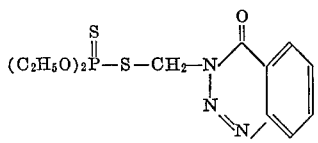 (Comparative preparation known from German Pat. 927,270.) | 0.1 | 0 |
| (III₁) 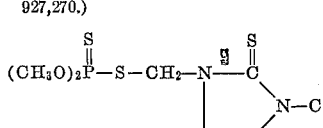 | 0.1 | 98 |

TABLE 1

| Active compound (constitution) | | Concentration of active compound, percent | Degree of destruction, percent after 24 hrs. |
|---|---|---|---|
| (IV$_1$) | (C$_2$H$_5$O)$_2$P(=S)—S—CH$_2$—N—C(=S)(N—CH$_3$)(N=CH) (ring) | 0.1 | 100 |
| (V$_1$) | (C$_2$H$_5$O)$_2$P(=S)—S—CH$_2$—N—C(=S)(N—C$_6$H$_5$)(N=CH) (ring) | 0.1 | 100 |
| (VI$_1$) | (C$_3$H$_5$O)$_2$P(=O)—S—CH$_2$—N—C(=S)(N—C$_6$H$_5$)(N=CH) (ring) | 0.1 | 98 |
| (VII$_1$) | (CH$_3$)$_2$P(=S)—S—CH$_2$—N—C(=S)(N—C$_6$H$_4$—Cl)(N=CH) (ring) | 0.1 | 90 |
| (VIII$_1$) | (C$_2$H$_5$O)$_2$P(=S)—S—CH$_2$—N—C(=S)(N—C$_6$H$_4$—Cl)(N=CH) (ring) | 0.1<br>0.01 | 100<br>90 |

EXAMPLE 2

Phaedon larvae test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbages leaves (*Brassica oleracea*) are sprayed with this preparation of the given active compound until dripping wet and then infested with mustard beetle larvae (*phaedon cochleariae*).

After the period of time stated in the following table, the degree of destruction of the pests is determined and expressed as a percentage: 100% means that all the beetle larvae are killed and 0% means that none of the beetle larvae are killed.

The particular active compounds tested, the concentrations used of the active compounds, the evaluation time and the experimental results obtained can be seen from the following Table 2.

TABLE 2

| Active compound (constitution) | | Concentration of active compound, percent | Degree of destruction, percent after 24 hrs. |
|---|---|---|---|
| (III$_2$) | (CH$_3$O)$_2$P(=S)—S—CH$_2$—N—C(=S)(N—CH$_3$)(N=CH) (ring) | 0.1<br>0.01 | 100<br>100 |
| (IV$_2$) | (C$_2$H$_5$O)$_2$P(=S)—S—CH$_2$—N—C(=S)(N—CH$_3$)(N—CH) (ring) | 0.1<br>0.01 | 100<br>100 |
| (V$_2$) | (C$_2$H$_5$O)$_2$P(=S)—S—CH$_2$—N—C(=S)(N—C$_6$H$_5$)(N=CH) (ring) | 0.1<br>0.01 | 100<br>75 |
| (VIII$_2$) | (C$_2$H$_5$O)$_2$P(=S)—S—CH$_2$—N—C(=S)(N—C$_6$H$_4$—Cl)(N—CH) (ring) | 0.1<br>0.01<br>0.001 | 100<br>100<br>40 |

EXAMPLE 3

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time, the degree of destruction is determined as a percentage: 100% means that all the aphids are killed whereas 0% means that none of the aphids are killed.

The particular active compounds, the concentrations of such active compounds, the evaluation time and the results obtained can be seen from the following Table 3:

TABLE 3

| Active compound (constitution) | | Concentration of active compound, percent | Degree of destruction, percent after 24 hrs. |
|---|---|---|---|
| (A) | $(C_2H_5O)_2\overset{S}{\underset{\|}{P}}-S-CH_2-N\diagup\diagdown$ (benzotriazinone ring with C=O) (Comparative preparation known from German Pat. 927,270.) | 0.1<br>0.01 | 100<br>50 |
| (III$_3$) | $(CH_3O)_2\overset{S}{\underset{\|}{P}}-S-CH_2-N-\overset{S}{\underset{\|}{C}}\diagdown$<br>$\phantom{XXXXXXXXXXXX}\underset{N=CH}{\|}\phantom{X}N-CH_3$ | 0.1<br>0.01<br>0.001 | 100<br>99<br>40 |
| (IV$_3$) | $(C_2H_5O)_2\overset{S}{\underset{\|}{P}}-S-CH_2-N-\overset{S}{\underset{\|}{C}}\diagdown$<br>$\phantom{XXXXXXXXXXXX}\underset{N=CH}{\|}\phantom{X}N-CH_3$ | 0.1<br>0.01<br>0.001 | 100<br>100<br>99 |

EXAMPLE 4

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100% means that all the spider mites are killed whereas 0% means that none of the spider mites are killed.

The particular active compound, the concentration of such active compound, the evaluation time and the result obtained can be seen from the following Table 4:

TABLE 4

| Active compound (constitution) | | Concentration of active compound, percent | Degree of destruction, after 2 days |
|---|---|---|---|
| (IV$_4$) | $(C_2H_5O)_2\overset{S}{\underset{\|}{P}}-S-CH_2-N-\overset{S}{\underset{\|}{C}}-N-CH_3$<br>$\phantom{XXXXXXXXXXXXXXX}\underset{N=CH}{\|}$ | 0.1 | 100 |

The process for producing the particular new compounds of the present invention is illustrated without limitation by the following further examples.

EXAMPLE 5

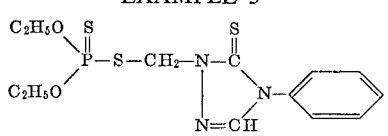

22.5 g. of 2-(N-chloromethyl)-4-phenyl-1,2,4-triazoline-3-thione (prepared according to "Chim. geterocikyl. soed." 1965, No. 1, pages 138–139) are dissolved in 250 cc. ethanol and to this solution there are added 20.5 g. ammonium O,O-diethyl-thionothiolphosphate. The mixture is then heated to 50 to 60° C. for 48 hours, with stirring. Thereafter, the precipitated inorganic salts are separated and the solvent is evaporated from the filtrate under reduced pressure. The residue which remains behind is recrystallized from benzene. There are thus obtained 23 g. (84% of the theory) of O,O-diethyl-S-[4-phenyl-1,2,4-triazoline-3-thione - 2 - yl-methyl] - thionothiolphosphoric acid ester which melts at 84° C.

In a manner analogous to that described above, the corresponding O,O - dimethylthionothiolphosphoric acid ester of melting point 61° C. is obtained, i.e., O,O-dimethyl-S-[4-phenyl-1,2,4-triazoline-3-thione-2-yl-methyl]-thionothiolphosphoric acid ester (XI₁).

EXAMPLE 6

(III)₄
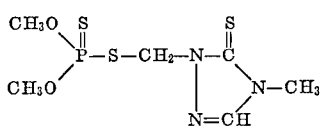

16.3 g. of 2-(N-chloromethyl) - 4 - methyl-1,2,4-triazoline-3-thione in 200 cc. acetonitrile are heated together with 15 g. anhydrous potassium carbonate and 16.5 g. O,O-dimethylthionothiolphosphoric acid to 60° C. (bath temperature) for 24 hours, with stirring. After separation of the inorganic constituents, the acetonitrile is drawn off under reduced pressure; there remain behind 23 g. of O,O - dimethyl-S-[4-methyl-1,2,4-triazoline-3-thione-2-yl-methyl]-thionothiolphosphoric acid ester as colorless oil.

*Analysis.* — Calculated for C₆H₁₂N₃O₂PS₃ (molecular weight=275) (percent): C, 25.26; H, 4.24; N, 14.72; P, 10.88. Found (percent): C, 25.41; H, 4.62; N, 14.70; P, 10.01.

Analogously, with the use of O,O-diethylthionothiolphosphoric acid, the corresponding O,O-diethyl-S-[4-methyl - 1,2,4 - triazoline-3-thione-2-yl-methyl]-thionothiolphosphoric acid ester (IV₃) is obtained as colorless oil.

*Analysis.*—Calculated for C₈H₁₆N₃O₂PS₃ (molecular weight=313) (percent): C, 30.66; H, 5.15; N, 13.41; P, 9.91. Found (percent): C, 30.23; H, 5.52; N, 13.12; P, 9.72.

EXAMPLE 7

(VI₂)
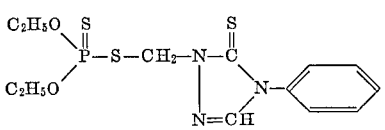

A mixture of 12.5 g. of 2-(N-chloromethyl)-4-phenyl-1,2,4-triazoline-3-thione, 10.5 g. ammonium O,O-diethylthiol phosphate and 150 cc. ethanol is stirred for twelve hours at 50° C. The precipitated inorganic salts are then separated and the residue is concentrated by evaporation. The residue solidifies to crystalline form after standing for a time. There are thus obtained 14 g. of O,O-diethyl-S-[4 - phenyl - 1,2,4 - triazoline-3-thione-2-yl-methyl]-thiolphosphoric acid ester which melts at 64° C. after recrystallization from benzene.

EXAMPLE 8

(VII₂)
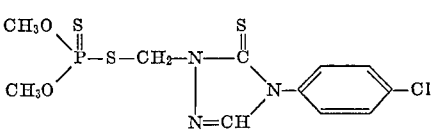

12 g. of 2-(N-chloromethyl)-4-(4'-chlorophenyl)-1,2,4-triazoline-3-thione in 150 cc. methanol are stirred together with 8.7 g. ammonium O,O-dimethylthionothiolphosphate for 48 hours at 50° C. After cooling of the mixture the precipitated inorganic salts are separated and the methanol is evaporated from the filtrate. The residue which remains behind crystallizes after standing for a time and melts then at 91° C. There are thus obtained 17.2 g. of O,O-dimethyl-S-[4-(4'-chlorophenyl)-1,2,4-triazoline-3-thione-2-yl-methyl]-thionothiolphosphoric acid ester.

There is obtained in an analogous manner the corresponding O,O - diethyl-S-[4-(4'-chlorophenyl)-1,2,4-triazoline - 3 - thione-2-yl-methyl]-thionothiolphosphoric acid ester (VIII₃) as colorless oil.

*Analysis.*—Calculated for C₁₃H₁₇ClN₃O₂PS₃ (molecular weight=410.5) (percent): C, 38.09; H, 4.18; N, 10.26; P, 7.58. Found (percent): C, 37.82; H, 4.50; N, 10.01; P, 7.43.

The 2-(N-halomethyl)-1,2,4-triazoline-3-thione derivatives required as starting materials can be obtained, e.g., as follows:

(IIbb)
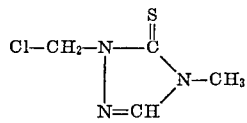

To a solution of 6.9 g. sodium in 500 cc. ethanol there are added 31.5 g. 4-methylthiosemicarbazide and 24 g. formic acid ethyl ester, and the mixture is then stirred overnight at 80° C. (bath temperature). After cooling, the reaction mixture is evaporated, the residue is taken up in water and the 4-methyl-1,2,4-triazoline-3-thione is precipitated by addition of acetic acid to the aqueous solution. After recrystallization from water, the compound melts at 171° C. The yield is 23 g.

The intermediate product thus obtained is dissolved in 500 cc. ethanol and the solution, after the addition of 6 g. paraformaldehyde and 1 g. potassium hydroxide, is heated to the boil for a longer period. After cooling of the mixture, the latter is evaporated, the residue is recrystallized from ethanol and 20 g. 2-(N-hydroxy-methyl)-4-methyl-1,2,4-triazoline-3-thione of melting point 131° C. are obtained.

The last-bentioned compound is dissolved in 200 cc. toluene and this solution, after the addition of 1 cc. dimethylformamide, is treated with 12 cc. thionyl chloride. After the reaction mixture has been heated to 90° C. for several hours until the evolution of gas ceases, the toluene is distilled off. In this manner 21 g. of 2-(N-chloromethyl)-4-methyl-1,2,4-triazoline-3-thione are obtained. After recrystallization from methanol, the product melts at 117° C.

The analogous starting materials are prepared in the same way utilizing the correspondingly 4-substituted thiosemicarbazides such as 4-phenyl-, 4-amino-, and 4-(halo-, nitro-, lower alkyl-, lower alkoxy-, and/or lower alkylmercapto- -substituted phenyl)- -thiosemicarbazide (i.e., NN₂—NH—CS—NH—R₄) with the corresponding lower alkanoic acid- and benzoic acid- -lower alkyl esters, (i.e. R₃—COOC₂H₅).

EXAMPLE 9

(X₁)
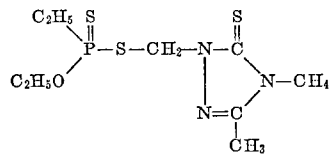

17.7 g. of 2-(N-chloromethyl)-4,5-dimethyl-1,2,4-triazoline-3-thione (M.P. 136° C.) are heated together with 20.8 g. potassium ethyl-O-ethylthionothiolphosphonate in 200 cc. ethanol to 50° C. for two days, with stirring. The mixture is then poured into 500 cc. water, and the precipitate is recrystallized from aqueous ethanol. There are obtained in this manner 22.7 g. (96% of the theory) of ethyl - O - ethyl-S-[4,5-dimethyl-1,2,4-triazoline-3-thione-2-yl-methyl]-thionothiolphosphonic acid ester of melting point 75° C.

EXAMPLE 10

(XI₁)
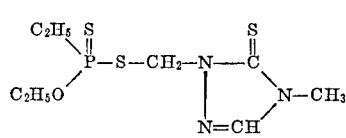

16.3 g. of 2-(N-chloromethyl)-4-methyl-1,2,4-triazoline 3-thione in 250 cc. ethanol together with 20.8 g. potassium ethyl-O-ethylthionothiolphosphonate are heated to 50° C. for two days, with stirring. The reaction mixture is then concentrated by evaporation and poured into water. The precipitate is recrystallized from a benzene-ligroin mixture. There are thus obtained 25.7 g. (86.5% of the theory) of ethyl-O-ethyl-S-[4-methyl-1,2,4-triazoline-3-thione-2-yl-methyl] - thionothiolphosphonic acid ester of melting point 56° C.

EXAMPLE 11

(XII₁)

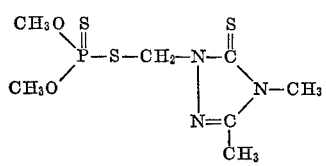

A mixture of 17.7 g. of 2-(N-chloromethyl)-4,5-dimethyl-1,2,4-thiazoline-3-thione, 17.5 g. ammonium, O,O-dimethylthionothiolphosphate and 200 cc. methanol is stirred for 48 hours at an internal temperature of 50° C. After cooling of the reaction mixture, the latter is concentrated by evaporation and stirred together with water. The precipitated product is recrystallized from methanol. 21 g. (71% of the theory) of O,O-dimethyl-S-[4,5-dimethyl-1,2,4-triazoline - 3 - thione-2-yl-methyl] - thionothiolphosphoric acid ester of melting point 113° C. are obtained.

In an analogous manner, O,O-diethyl-S-[4,5-dimethyl-1,2,4-triazoline - 3 - thione-2-yl-methyl]-thionothiolphosphoric acid ester (XIII₁) of melting point 77° C. is obtained.

EXAMPLE 12

Using corresponding molar amounts of each of the following phosphorous acid ester salts with each of the following 2-(N-halomethyl)-1,2,4-triazoline-3-thiones, respectively, in accordance with the procedure of Example 5, as the case may be:

(a) Phenyl-O-sec.-butyl-phosphonic acid sodium salt and 2-(N-chloromethyl)-1,2,4-triazoline-3-thione;

(b) Phenyl-O-n-butyl-thiolphosphonic acid potassium salt and 2-(N-chloromethyl)-4-amino-5-phenyl-1,2,4-triazoline-3-thione;

(c) Isobutyl-O-n-propyl-thionophosphonic acid ammonium salt and 2-(N-chloromethyl)-4-(3'-nitrophenyl)-5-isopropyl-1,2,4-triazoline-3-thione;

(d) O-n-propyl - O - isopropyl-thionothiolphosphoric acid sodium salt and 2-(N-chloromethyl)-4-(4'-n-propylphenyl)-1,2,4-triazoline-3-thione;

(e) Phenyl-O-isobutyl-phosphonic acid ammonium salt and 2-(N-chloromethyl)-4-(3'-isobutoxyphenyl)-5-phenyl-1,2,4-triazoline-3-thione;

(f) Sec.-butyl-O-ethyl-thionophosphonic acid sodium salt and 2-(N-chloromethyl)-4-(4'-tert.-butylmercaptophenyl)-5-n-butyl-1,2,4-triazoline-3-thione; and (g) O-isobutyl-O-methyl-thionophosphoric acid potassium salt and 2-(N-chloromethyl)-4-(2',6'-dichloro-3'-nitro-4'-methoxyphenyl)-5-phenyl - 1,2,4 - triazoline-3-thione; the corresponding isothiuronium salts are produced;

(a') Phenyl-O-sec. - butyl-O-[1,2,4-triazoline-3-thione-2-yl-methyl]-phosphonic acid ester;

(b') Phenyl-O-n-butyl-S-[4-amino - 5 - phenyl-1,2,4-triazoline-3-thione-2-yl-methyl] - thiolphosphonic acid ester;

(c') Isobutyl-O-n-propyl - O - [4-(3'-nitrophenyl)-5-isopropyl-1,2,4-triazoline-3-thione-2-yl-methyl] - thionophosphonic acid ester;

(d') O-n-propyl - O - isopropyl - S - [4-(4'-n-propylphenyl)-1,2,4-triazoline - 3 - thione-2-yl-methyl]-thionothiolphosphoric acid ester;

(e') Phenyl-O-isobutyl - O - [4-(3'-isobutoxyphenyl)-5-phenyl-1,2,4-triazoline - 3 - thione-2-yl-methyl]-phosphonic acid ester;

(f') Sec.-butyl - O - ethyl-O-[4-(4'-tert.-butylmercaptophenyl)-5-n-butyl-1,2,4-triazoline-3 - thione-2-yl-methyl]-thionophosphonic acid ester; and (g') O-isobutyl-O-methyl - O - [4-(2',6'-dichloro-3'-nitro-4'-methoxy-phenyl) - 5 - phenyl-1,2,4-triazoline-3-thione-2-yl-methyl]-thionophosphoric acid ester.

Advantageously, in accordance with the present invention, in the foregoing formulae:

$R_1$ represents:

Lower alkyl such as methyl, ethyl, n-propyl, isopropyl, n-butyl, iso-butyl, sec.-butyl, tert.-butyl, and the like, especially methyl, ethyl, n-propyl, isopropyl, n-butyl, isobutyl and sec.-butyl, and most especially alkyl having 1–4 carbon atoms;

Lower alkoxy such as methoxy, ethoxy, n-propoxy, isopropoxy, n-butoxy, isobutoxy, sec.-butoxy, tert.-butoxy, and the like, especially methoxy, ethoxy, n-propoxy, isopropoxy, n-butoxy, isobutoxy, and sec.-butoxy, and most especially alkoxy having 1–4 carbon atoms; or phenyl;

$R_2$ represents:

Lower alkyl as defined above for $R_1$, in which case $R_1$ and $R_2$ may be the same or different;

$R_3$ represents:

Hydrogen; lower alkyl as defined above for $R_1$ and $R_2$, in which case $R_1$, $R_2$ and/or $R_3$ may be the same or different; or phenyl;

$R_4$ represents:

Hydrogen; amino; lower alkyl as defined above for $R_1$, in which case $R_1$, $R_2$, $R_3$ and/or $R_4$ may be the same or different; phenyl; or Substituted phenyl which is mono, di, tri, poly or mixed substituted with Halo such as chloro, bromo, fluoro and/or iodo, especially chloro, bromo and/or fluoro, and most especially chloro; nitro;

Lower alkyl as defined above for $R_1$, in which case $R_1$, $R_2$, $R_3$, $R_4$ and/or such phenyl substituent may be the same or different;

Lower alkoxy as defined above for $R_1$, in which case $R_1$ and/or such phenyl substituent may be the same or different; and/or Lower alkylmercapto such as methylmercapto, ethylmercapto, n-propylmercapto, isopropylmercapto, n-butylmercapto, isobutylmercapto, sec.-butylmercapto, tert.-butylmercapto, and the like, especially methyl-, ethyl-, n-propyl-, isopropyl-, n-butyl-, isobutyl- and sec.-butyl--mercapto, and most expecially alkylmercapto having 1–4 carbon atoms;

i.e., including mixtures of all of the foregoing phenyl substituents; and X and Y each respectively represents oxygen or sulfur.

Preferably, $R_1$ is lower alkyl or lower alkoxy, $R_2$ is lower alkyl, $R_3$ is hydrogen or lower alkyl, $R_4$ is lower alkyl, phenyl or mono substituted phenyl, especially monochlorophenyl, X is oxygen or sulfur, and Y is sulfur.

More particularly, $R_1$ is $C_{1-4}$ alkoxy, $R_2$ is $C_{1-4}$ alkyl, $R_3$ is hydrogen, $R_4$ is $C_{1-4}$ alkyl, phenyl or monochlorophenyl, and X is oxygen or sulfur, and Y is sulfur.

It will be realized by the artisan that all of the foregoing compounds contemplated by the present invention possess the desired selective pesticidal, especially arthropodicidal, i.e., insecticidal or acaricidal, properties for combatting insects and acarids, and that such compounds have not only a very slight toxicity toward warm-blooded creatures, but also a concomitantly low phytotoxicity.

It will be appreciated that as may be used herein, i.e., both in the specification and claims, the terms "arthropod," "arthropodicidal" and "arthropodicide" are defined as including specifically both insects and acarids within the contemplation of their meaning, for convenience in determining the collective aspects of utility herein. Thus, the insects and acarids may be considered herein collectively as arthropods to be combatted collectively in accordance with the invention, and accordingly the insecticidal and/or acaricidal activity may be termed arthropodicidal activity, and the concomitant combative or effective amount used in accordance with the invention will be an arthropodicidally effective amount which in effect means an insecticidally or acaricidally effective amount of the active compound for the desired purposes.

It will be appraciated that the instant specification and examples are set forth by way of illustration and not limitation, and that various modifications and changes may be made without departing from the spirit and scope of the present invention which is to be limited only by the scope of the appended claims.

What is claimed is:

1. Isothiuronium salt having the formula

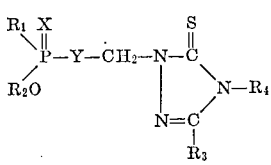

in which $R_1$ is selected from the group consisting of lower alkyl and lower alkoxy, $R_2$ is lower alkyl, $R_3$ is selected from the group consisting of hydrogen and lower alkyl, $R_4$ is selected from the group consisting of lower alkyl, phenyl, and mono-substituted phenyl which is substituted with a substituent selected from the group consisting of halo, nitro, lower alkyl, lower alkoxy, and lower alkylmercapto, X is selected from the group consisting of oxygen and sulfur, and Y is sulfur.

2. Salt according to claim 1 wherein $R_1$ is alkoxy having 1–4 carbon atoms, $R_2$ is alkyl having 1–4 carbon atoms, $R_3$ is hydrogen, $R_4$ is selected from the group consisting of alkyl having 1–4 carbon atoms, phenyl, and monochlorophenyl, X is selected from the group consisting of oxygen and sulfur, and Y is sulfur.

3. Salt according to claim 1 wherein such compound is O,O-dimethyl-S-[4-methyl-1,2,4 - triazoline-3-thione-2-yl-methyl]-thionothiolphosphoric acid ester having the formula

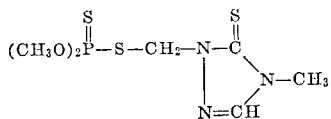

4. Salt according to claim 1 wherein such compound is O,O - diethyl-S-[4-methyl-1,2,4-triazoline-3-thione-2-yl-methyl]-thionothiolphosphoric acid ester having the formula

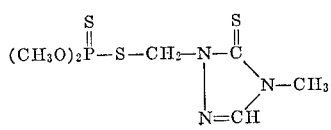

5. Salt according to claim 1 wherein such compound is O,O - diethyl-S[4-phenyl-1,2,4-triazoline-3-thione-2-yl-methyl]-thiolphosphoric acid ester having the formula

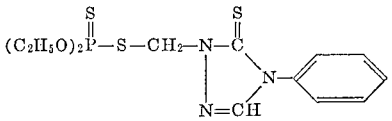

6. Salt according to claim 1 wherein such compound is O,O - diethyl-S-[4-(4'-chlorophenyl)-1,2,4-triazoline-3-thione-2-yl-methyl]-thionothiolphosphoric acid ester having the formula

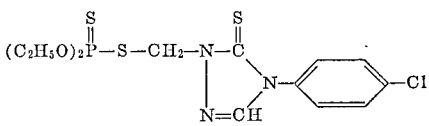

7. Salt according to claim 1 wherein such compound is ethyl-O-ethyl-S-[4,5-dimethyl - 1,2,4-triazoline-3-thione-2-yl-methyl]-thionothiolphosphonic acid ester having the formula

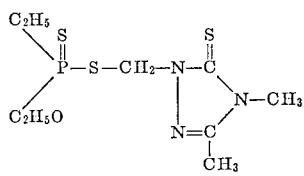

8. Salt according to claim 1 wherein such compound is ethyl-O-ethyl-S-[4-methyl-1,2,4-triazoline-3-thione-2-yl-methyl]-thionothiolphosphonic acid ester having the formula

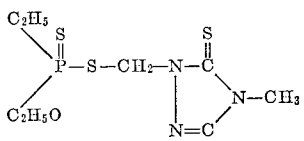

9. Salt according to claim 1 wherein such compound is O,O-dimethyl-S-[4,5-dimethyl-1,2,4-triazoline-3-thione-2-yl-methyl]-thionothiolphosphoric acid ester having the formula

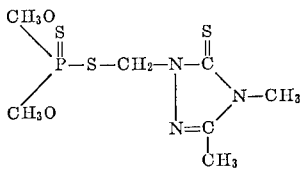

References Cited

UNITED STATES PATENTS 3,239,532    3/1966    Rufenacht _____ 260—302

ALTON D. ROLLINS, Primary Examiner

U.S. Cl. X.R.

424—200

FO-1050
(5/69)

UNITED STATES PATENT OFFICE
CERTIFICATE OF CORRECTION

Farben 1332-LH(rr

Patent No. 3,594,390       Dated July 20, 1971

Inventor(s) Helmut Timmler, Ingebord Hammann, and Richard Wegler

It is certified that error appears in the above-identified patent and that said Letters Patent are hereby corrected as shown below:

Col. 2, line 44 - "R" should be --$R_3$--.

Col. 3, line 60 - "maritimum" should be --maritimus--.

Col. 4, line 7 - "bettles" should be --beetles--.

Col. 4, line 68 - "1969" should be --1960--.

Col. 5, line 13 - "assistantes" should be --assistants--.

Col. 11, line 5 - "($XI_1$)" should be --($IX_1$)--.

Col. 12, line 29 - "bentioned" should be --mentioned--.

Col. 12, line 50 - "$CH_4$" should be --$CH_3$".

Col. 15, line 5 - "appraiciated" should be --appreciated--.

Col. 15, formula of claim 4, "$(CH_3O)_2$" should be --$(C_2H_5O)_2$--.

Signed and sealed this 14th day of March 1972.

(SEAL)
Attest:

EDWARD M. FLETCHER, JR.
Attesting Officer

ROBERT GOTTSCHALK
Commissioner of Patents